Figure 1:
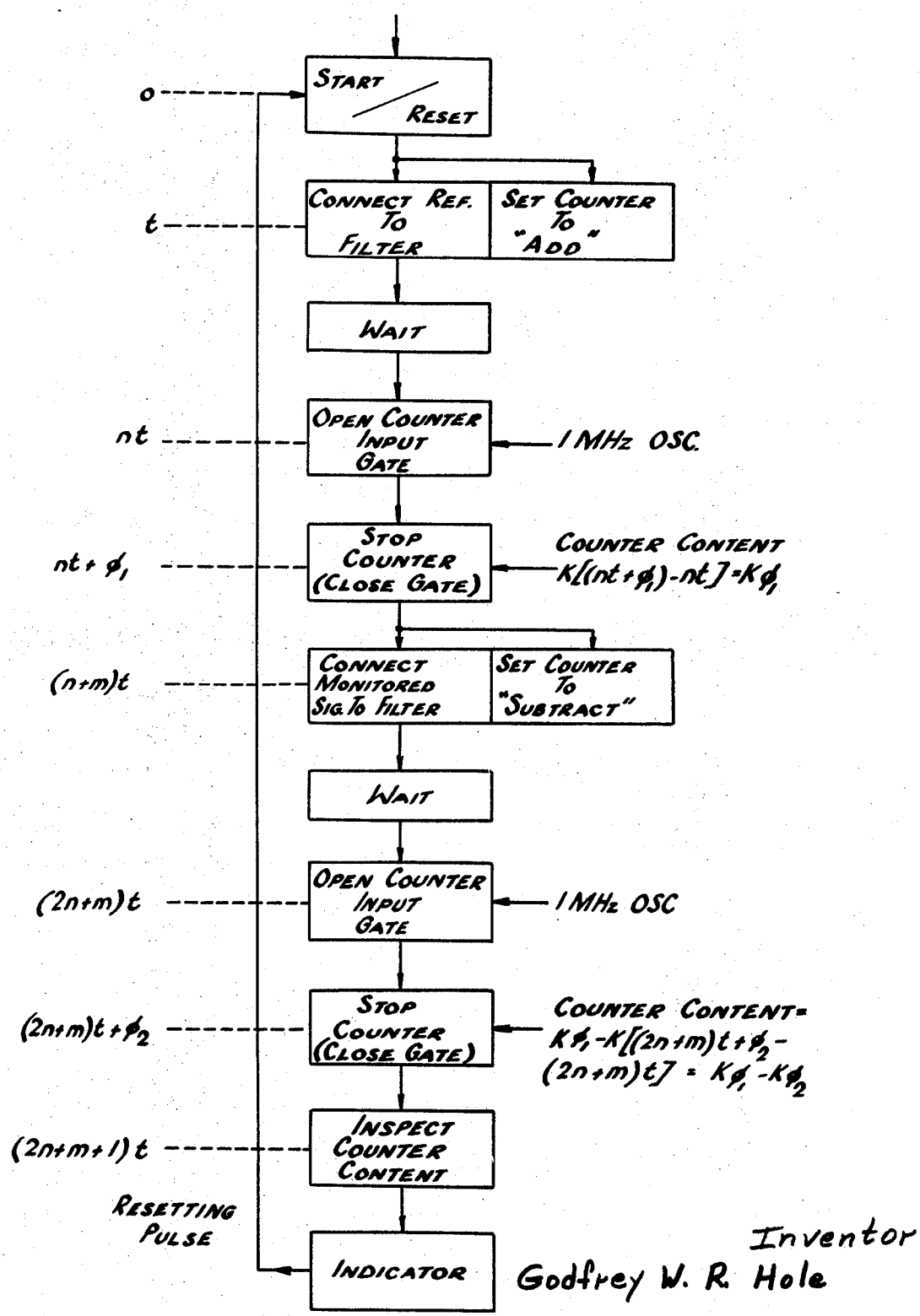

United States Patent

[11] 3,582,780

| [72] | Inventor | Godfrey W. Hole<br>Avalon, New South Wales, Australia |
|---|---|---|
| [21] | Appl. No. | 784,593 |
| [22] | Filed | Dec. 18, 1968 |
| [45] | Patented | June 1, 1971 |
| [73] | Assignee | Amalgamated Wireless (Australasia) Limited<br>Sydney, New South Wales, Australia |

[54] SYSTEM RESPONSIVE TO CHANGE OF PHASE BETWEEN TWO ELECTRICAL WAVES
9 Claims, 2 Drawing Figs.

[52] U.S. Cl. ................................................. 324/83D
[51] Int. Cl. ............................................... G01r 25/00
[50] Field of Search ........................................ 324/83 A,
83 D; 328/133; 235/92.62, 151.31

[56] References Cited
UNITED STATES PATENTS
| 2,971,086 | 2/1961 | Feijoo et al. .................. | 328/133 |
| 3,249,868 | 5/1966 | Sheftelman .................. | 324/83 |

*Primary Examiner*—Alfred E. Smith
*Attorney*—Stevens, Davis, Miller and Mosher

ABSTRACT: A phase measuring and monitoring circuit adapted to measure the phase difference between a reference signal and a monitored signal having a counter switchable to either an add or substract mode, the input to which is a sequence of measured pulses controlled by a filter and zero-crossing detector, the inputs of which are time-shared by the reference signal and the signal to be measured.

SYSTEM RESPONSIVE TO CHANGE OF PHASE BETWEEN TWO ELECTRICAL WAVES

This invention is directed towards a phase measuring and monitoring circuit responsive to a change of phase between two electrical waves. A time-shared zero-crossing method of phase comparison is disclosed, which offers advantages over previously known methods. In general, one of the two waves will in practice perform the function of a reference wave whilst the other wave will be subject to phase variation relative thereto. The circuit may optionally be adapted to provide an indicated measurement of the phase difference between the two waves, or to provide an indication of the "pass-fail" type in response to a predetermined phase difference between the two waves.

A typical application of this invention wherein measurement and indication of phase is required to a high degree of accuracy is to navigation aids such as VOR, LORAN and OMEGA, wherein there is a requirement for accurate measurement of phase at low frequencies. Phase measurements to an accuracy of better than 0.1° are readily attainable using devices and components available at present, having regard also to the fact that a circuit stability of at least an order of magnitude better is desirable.

In an exemplification of this invention in which indicated measurement of phase difference is provided, the problem is in essence, as will be seen later, that of performing a precise measurement of the phase difference between two waves. In fact, as will appear from descriptions which follow later, the measurement of phase difference in the circuit in accordance with this invention involves two such essential measurements, but this does not alter the basic premise. Zero-crossing has been selected as the basic techniques for these measurements.

It is true that techniques other than that of the zero-crossing method are available, but although such techniques are theoretically capable of meeting the accuracy requirements, great attention is necessary to the problems of circuit drift in order that the desired stability shall be achieved. This is true, for example, of recently developed techniques using active filters and active impedance techniques, where, in general, unrealizable component stability would be required in order to provide the required degree of circuit stability. The main advantage of techniques other than of the zero-crossing method would appear to be the ability of such methods to measure all phase angles over a complete cycle. But this facility is not required to meet the main problem to which this invention is directed, so that the zero-crossing method is again suggested.

In the zero-crossing method, as is known, the time interval between the zero-crossing of the two waves is measured, and is representative of the phase difference between the two waves. It is also known that if harmonic distortion is present on one or both of the waves, then the points at which the zero-crossing occur may vary from the zero-crossing points of a corresponding pure sine wave, so that although the measurement of the time interval between the zero-crossings of the two waves may be carried out with the required accuracy and stability, an error will inevitably intrude.

In practice it is generally assumed that one wave, usually referred to as the "reference wave" is substantially free of harmonics, so that one needs to consider only harmonic distortion of the "monitored" wave. One method of overcoming the problem presented by the presence of harmonic distortion on the monitored wave is to supply a suitable filter and zero detector in both the reference and the monitored phase channels. The two filters would need to be phase matched to a high degree if reasonable circuit stability is to be maintained. This solution is feasible to the extent that suitably matched components can be provided for operation over the required temperature range, but it reintroduces the linear drift problems mentioned earlier in relation to the alternative methods of phase measurement, and so at least partially negates the advantages to be expected of the zero-crossing method.

One object of this invention is to provide a circuit in which a novel method is employed in which time sharing of one filter and one zero detector allows the earlier-mentioned disadvantages of the zero-crossing method to be avoided whilst preserving the known advantages of the method.

A further object of this invention is to provide a phase measuring circuit employing the aforesaid novel method.

A further object of this invention is to provide a phase monitoring circuit employing the aforesaid novel method, and optionally adaptable to provide an indication in response to a predetermined phase difference.

According to this invention a phase measuring circuit adapted to measure the phase difference between a reference signal and a signal to be measured comprises in combination a source of a third signal locked in frequency to the frequency of the reference signal and the frequency of the signal to be measured, and herein referred to as the comparison signal, filtering means adapted to pass a fundamental wave of the common frequency of all three signals, zero-detection means responsive to the zero crossing of an applied wave and adapted to provide an output signal when an applied wave passes through a zero-crossing, counting means which can be switched to either an adding or a subtracting mode, a source of counting pulses of high repetition frequency compared with the common frequency and having a fixed frequency relationship thereto, gating means to control the application of the counting pulses to the counter and sequential control and switching means which program a measuring sequence in which the said filtering means and zero detection means are time-shared by the reference signal and the signal to be measured, and wherein a first counting regime with the counter in the adding mode provides a counter content representative of the phase difference between the comparison signal and the reference signal, and a second counting regime with the counter in the subtracting mode wherein the counter is counted in the opposite direction provides an opposite count to an extent representative of the phase difference between the comparison signal and the signal to be measured, whereby the final counter content is representative of the phase difference between the reference signal and the signal to be measured.

According to this invention a phase monitoring circuit adapted to monitor the phase difference between a reference signal and a signal to be monitored comprises in combination a source of a third signal locked in frequency to the frequency of the reference signal and the frequency of the signal to be monitored, and herein referred to as the comparison signal, filtering means adapted to pass a fundamental wave of the common frequency of all three signals, zero-detection means responsive to the zero crossing of an applied wave and adapted to provide an output signal when an applied wave passes through a zero crossing, counting means which can be switched to either an adding or a subtracting mode, a source of counting pulses of high repetition frequency compared with the common frequency, gating means to control the application of counting pulses to the counter and sequential control and switching means which program a measuring sequence in which the said filtering means and zero-detection means are time-shared by the reference signal and the signal to be monitored, and wherein a first counting regime with the counter in the adding mode provides a counter content representative of the phase difference between the comparison signal and the reference signal, and a second counting regime with the counter in the subtracting mode wherein the counter is counted in the opposite direction provides an opposite count to an extent representative of the phase difference between the comparison signal and the signal to be monitored, whereby the final counter content is representative of the phase difference between the reference signal and the signal to be monitored.

According to a further development of this invention the two counting regimes are initiated by an arbitrarily chosen point on the waveform of the comparison signal and are terminated respectively by a zero crossing of the reference signal and of the signal to be monitored.

According to a further development of this invention, the source of counting pulses is a controllable source the nominal frequency of which is an integral multiple of the reference frequency, and forms part of a frequency-lock loop including a frequency comparator, the output of which controls the output frequency of the controllable source, a first input to the frequency comparator consisting of the reference frequency and a second input thereto being derived from the the output of the controllable source through a frequency divider having a divider ratio corresponding to the aforesaid integral multiple.

The principle of the novel time-shared zero-crossing method of phase measurement according to this invention involves the making of two phase measurements. One measurement is made between the reference signal and an arbitrarily phased signal off the same frequency frequency-locked thereto, herein referred to as the comparison signal and a second measurement is made between the monitored signal and the comparison signal. If the reference signal and the monitored signal are in phase, then the two measurements will be equal. If the reference signal and the monitored signal are not in phase, then the two measurements will differ by an amount representative of the phase difference between the reference and monitored signals.

In practice a single binary counter is used to make both measurements in succession. For the first of the two measurements the counter is set to an adding mode. For the second of the two measurements the counter is set to a subtracting mode, so that after both measurements have been completed, the net counter content will be zero if the reference and monitored signals are in phase and will be representative of the phase difference if the two signals differ in phase.

In a general-purpose phase measuring arrangement in accordance with this invention, the comparison signal should be so locked to the reference frequency as to have a fixed frequency ratio relationship thereto. However, this is not mandatory for a simple phase monitor, say of the "pass-fail" type.

For a clearer explanation of this invention a flow diagram of the measurement procedure given in FIG. 1 of the accompanying drawings will be described, followed by a description of a block diagram of one practical example of the application of this invention, illustrated in FIG. 2.

Figure 2:
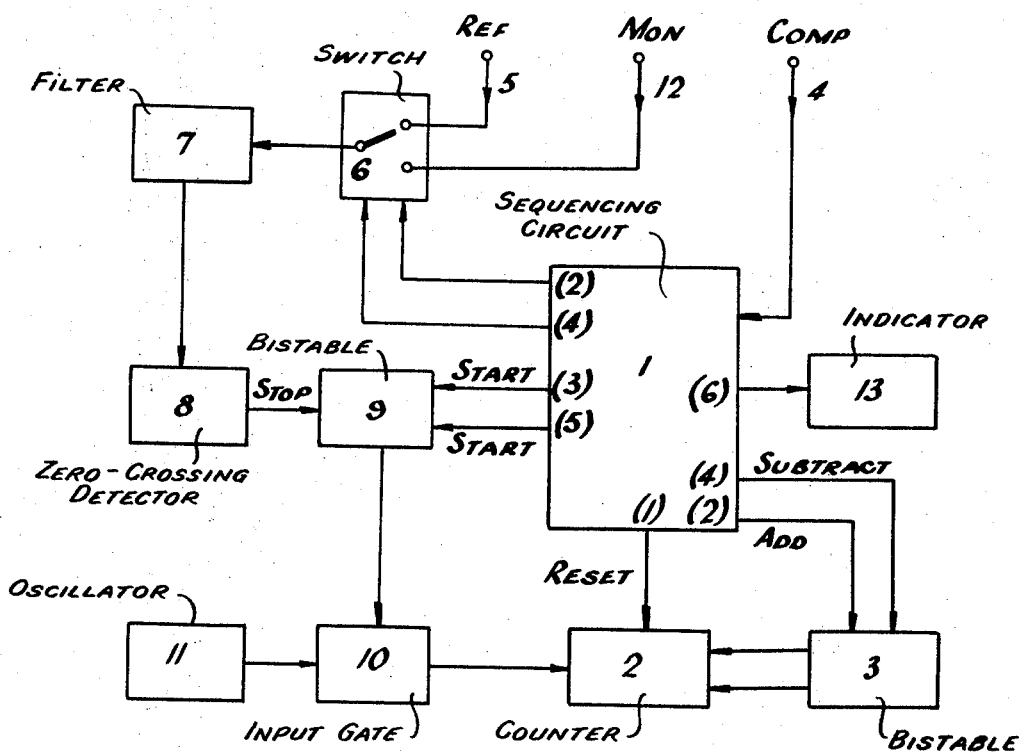

The flow diagram of FIG. 1 represents phase measuring and comparison functions that occur sequentially in order from the top of the diagram, according to the time scale down the left hand side of the diagram. At a time zero it is assumed the phase measuring process commences. At time $t$ the first of the two measurements is initiated by connecting the reference signal to the counter, at the same time setting the counter to the adding mode. After a waiting time an input gate of the counter is opened at time $nt$ by the frequency-locked comparison signal, for example, by a zero-crossing or other arbitrarily chosen point on the comparison signal waveform. The input gate then allows the output of an oscillator to be applied to and counted by the counter. Counting then proceeds until time $nt + \Phi_1$, when the input gate to the counter is closed by the zero crossing of the reference signal. The content of the counter now represents the phase relationship between the reference signal and the comparison signal, and is equal to $K[(ntB_1)-nt]=k\Phi_1$. This completes the first measurement. The counting pulses for the counter are here supplied by the oscillator. The frequency of this oscillator is not critical provided it is sufficiently high in relation to the frequency of the reference signal and the signal to be monitored to provide the required accuracy of measurement. The oscillator frequency would typically be chosen equal to $2^n$ times the comparison signal frequency.

The second measurement is initiated at time $(n+m)t$, where $m$ is greater than $\Phi_1$, at which point in time the monitored signal is connected to the counter, at the same time setting the counter to the subtracting mode. After a waiting time, the input gate of the counter is opened at time $(2n+m)t$ by the frequency-locked comparison signal as before. The input gate then allows the output of an oscillator to be applied to and counted by the counter. Counting then proceeds until time $(2n+m)t + \Phi_2$, when the input gate to the counter is closed by the zero crossing of the monitored signal.

The content of the counter now represents the difference between the phases of the reference signal and the comparison signal on the one hand and the phases of the monitored signal and the comparison signal on the other hand, that is, the phase difference between the reference and the monitored signals. The counter content is equal to $K\Phi_1-[(2n+m)t+\Phi_2-(2n+m)t]=K\Phi-K\Phi_2$.

The procedure finally involves the inspection of the counter content at time $(2n+m+)t$, where 1 is greater than $\Phi_2$. The result of the inspection of the counter content is then applied to any convenient form of indicator, and automatic recycling of the measurement process can be arranged by feedback of a signal to the starting point or by other convenient means. Optionally the indicator means can include the release of a characteristic indication when the phase difference between the two waves attains a predetermined value.

The speed at which the cycle of operations just described can be carried out is dependent on the settling down time of the single time-shared filter. The sequence of operations is controlled by a sequencing circuit of any convenient type known per se. One convenient type of known sequencing circuit is a standard binary counter of the synchronous type which avoids the generation of a phase count during transition; such a sequencing circuit advantageously consists of five stages of flip-flop with feedback to obtain a 30-bit counter wherein only six states are utilized, said six states being decoded to form six time sequential outputs. The frequency-locked comparison signal can be provided in any suitable way according to the requirements of the system. It could typically be frequency-locked to the reference signal, although other locking means could be employed where their use was indicated. A block circuit diagram of a typical application of this invention is seen in FIG. 2. In this diagram the sequencing circuit 1 delivers at predetermined times signals which initiate successive steps in the measuring processes, the sequence of these signals being represented by the numbers in parentheses shown within the block representing the sequencing circuit. Step 1 is to reset the counter 2 ready for the first of the two measurements. In step 2, which occurs at time $t$ of FIG. 1, the counter 2 is set to the adding mode through the bistable circuit 3, the comparison signal at terminal 4 is connected to the sequencing circuit 1 so that, inter alia, a decoded output therefrom will gate the output of the oscillator 11 applied to the counter at the required time, and the reference signal at terminal 5 is connected through the electronic switch 6, the filter 7, the zero-crossing detector 8 and the bistable circuit 9 to the input gate 10 of the counter.

In step 3, after a waiting period, the input gate 10 of the counter is opened by the comparison signal, allowing the output of the oscillator 11 to be applied to and counted in the counter. Counting proceeds until the zero crossing of the reference signal is reached whereupon the input gate 10 of the counter is closed by the zero crossing of the reference signal through the bistable circuit 9. The first of the two measurements, between the comparison signal and the reference signal, is now complete, and the counter content is representative of the phase difference between these signals.

The nest item in the sequence is step 4, in which the signal to be monitored at terminal 12 is connected through the electronic switch 6, the filter 7, the zero-crossing detector 8 and the bistable circuit 9 to the input gate 10 of the counter. At the same time the counter 2 is set to the subtracting mode through the bistable circuit 3. In step 5, after a waiting period, the input gate 8 of the counter is opened by the comparison signal, allowing the output of the oscillator 11 to be applied to and counted in the counter. Counting proceeds until the zero crossing of the monitored signal is reached, whereupon the input gate 10 of the counter is closed by the zero crossing of the monitored signal through the bistable circuit 9. This completes the second of the two measurements. In step 6, which completes the sequence, the content of the counter is inspected, for example, by application to an indicator 13.

The indicator 13 may be of any convenient form per se, ranging from, say, a simple lamp which is illuminated or not illuminated as the case may be for a simple phase monitor of the "pass-fail" type, to a full readout arrangement using, say, numerical indicator tubes ("Nixie" tubes) and associated control circuits for a phase measuring arrangement.

In a phase measuring circuit as described herein, and particularly when used, for example, as part of a VOR system, in which the reference signal frequency may vary by several parts percentum, it is necessary for the comparison signal to be frequency-locked to the reference frequency, as mentioned earlier. It is also desirable for the source of counting pulses, which are required to have a high repetition frequency relative to the reference frequency, to be frequency-locked to a fixed integral multiple of the reference frequency. These two conditions can be met in any manner known per se. For example, a simple frequency lock loop can be formed using a voltage-controlled oscillator having a nominal frequency equal to a selected integral multiple of the reference frequency as the source of counting impulses, a divider having a divider ratio corresponding to the said integral multiple arranged between the output of the voltage-controlled oscillator and a frequency comparator, a second input to the frequency comparator consisting of the reference signal, and means for applying the result of the comparison to the voltage-controlled oscillator so as to ensure locking.

The measuring and monitoring circuit according to this invention employs only one filter and one zero crossing detector, so that problems associated with the phase matching of two filters are avoided, and the advantages of the zero-crossing method of phase comparison are retained. Furthermore, although the description provided here assumed the usual condition that the reference signal would be free from harmonics, it will be seen that because the reference signal and the signal to be monitored are both passed through the filter, harmonics that may be present on the reference signal will also be removed. This may be advantageous in some circumstances, where the purity of the reference signal cannot be assured.

I claim:

1. A phase measuring circuit adapted to measure the phase difference between a reference signal and a signal to be measured, comprising in combination a source of a comparison signal locked in frequency to the frequency of the reference signal and to the frequency of the signal to be measured, filtering means to pass a fundamental wave of the common frequency of all three signals, zero-detection means responsive to the zero crossing of an applied wave and adapted to provide an output signal when said applied wave passes through a zero crossing, counting means which can be switched to either an adding or a subtracting mode, a source of counting pulses of a repetition frequency which is higher than the common frequency and having a fixed frequency relationship thereto, gating means to control the application of the counting pulses to the counter, and sequential control and switching means which program a measuring sequence in which said filtering means and zero-detection means are time-shared by the reference signal and the signal to be measured, and wherein a first counting regime with the counter in the adding mode provides a counter content representative of the phase difference between the comparison signal and the reference signal, and a second counting regime with the counter in the subtracting mode wherein the counter when counting in the opposite direction provides an opposite count to an extent representative of the phase difference between the comparison signal and the signal to be measured, and whereby the final counter content is representative of the phase difference between the reference signal and the signal to be measured.

2. A phase measuring circuit as claimed in claim 1 wherein the measuring sequence is automatically and continually recycled.

3. A phase measuring circuit as claimed in claim 1, wherein the source of counting pulses is a controllable source the nominal frequency of which is an integral multiple of the reference frequency, and forms part of a frequency-lock loop including a frequency comparator, the output of which comparator controls the output frequency of the controllable source, a first input to the frequency comparator consisting of the reference frequency and a second input thereto being derived from the output of the controllable source through a frequency divider having a divider ratio corresponding to the aforesaid integral multiple.

4. A phase measuring circuit as claimed in claim 1, further comprising means for initiating said first and second counting regimes at an arbitrarily chosen point on the wave form of said comparison signal and means for terminating said first and second counting machines at zero-crossings of said reference signal and said signal to be measured respectively.

5. A phase measuring circuit as claimed in claim 1, further comprising indicator means for displaying the phase difference between said reference signal and said signal to be measured.

6. A phase monitoring circuit adapted to monitor the phase difference between a reference signal and a signal to be monitored, comprising in combination a source of a comparison signal locked in frequency to the frequency of the reference signal and to the frequency of the signal to be monitored, filtering means to pass a fundamental wave of the common frequency of all three signals, zero-detection means responsive to zero crossing of an applied wave and adapted to provide an output signal when said applied wave passes through a zero crossing, counting means which can be switched to either an adding or a subtracting mode, a source of counting pulses of a repetition frequency which is higher than the common frequency, gating means to control the application of the counting pulses to the counter, sequential control and switching means which program a measuring sequence in which said filtering means and zero-detection means are time-shared by the reference signal and the signal to be monitored, and means giving a characteristic indication when the phase difference between the reference signal and the signal to be monitored attains a predetermined value, and wherein a first counting regime with the counter in the adding mode provides a counter content representative of the phase difference between the comparison signal and the reference signal, and a second counting regime with the counter in the subtracting mode wherein the counter when counting in the opposite direction provides an opposite count to an extent representative of the phase difference between the comparison signal and the signal to be monitored, and whereby the final counter content is representative of the phase difference between the reference signal and the signal to be monitored.

7. A time-shared zero-crossing method of phase measurement comprising the steps of: placing a binary counter in an adding mode; measuring a first phase difference between a reference signal and a arbitrarily phased frequency-locked comparison signal; placing said counter in a subtracting mode; measuring a second phase difference between a signal to be measured and said comparison signal; obtaining a phase difference between said first and second phase difference measurements; displaying the phase difference between said reference signal and said signal to be measured; and continuously repeating the sequence of said measurements.

8. A time-shared zero-crossing method of phase measurement as claimed in claim 7, comprising the further step of determining the period of said measurements by means of a source of counting pulses having a repetition frequency higher than the frequency of said reference signal.

9. A time-shared zero-crossing method of phase monitoring comprising the steps of: placing a binary counter in an adding mode; measuring a first phase difference between a reference